Patented Feb. 23, 1943

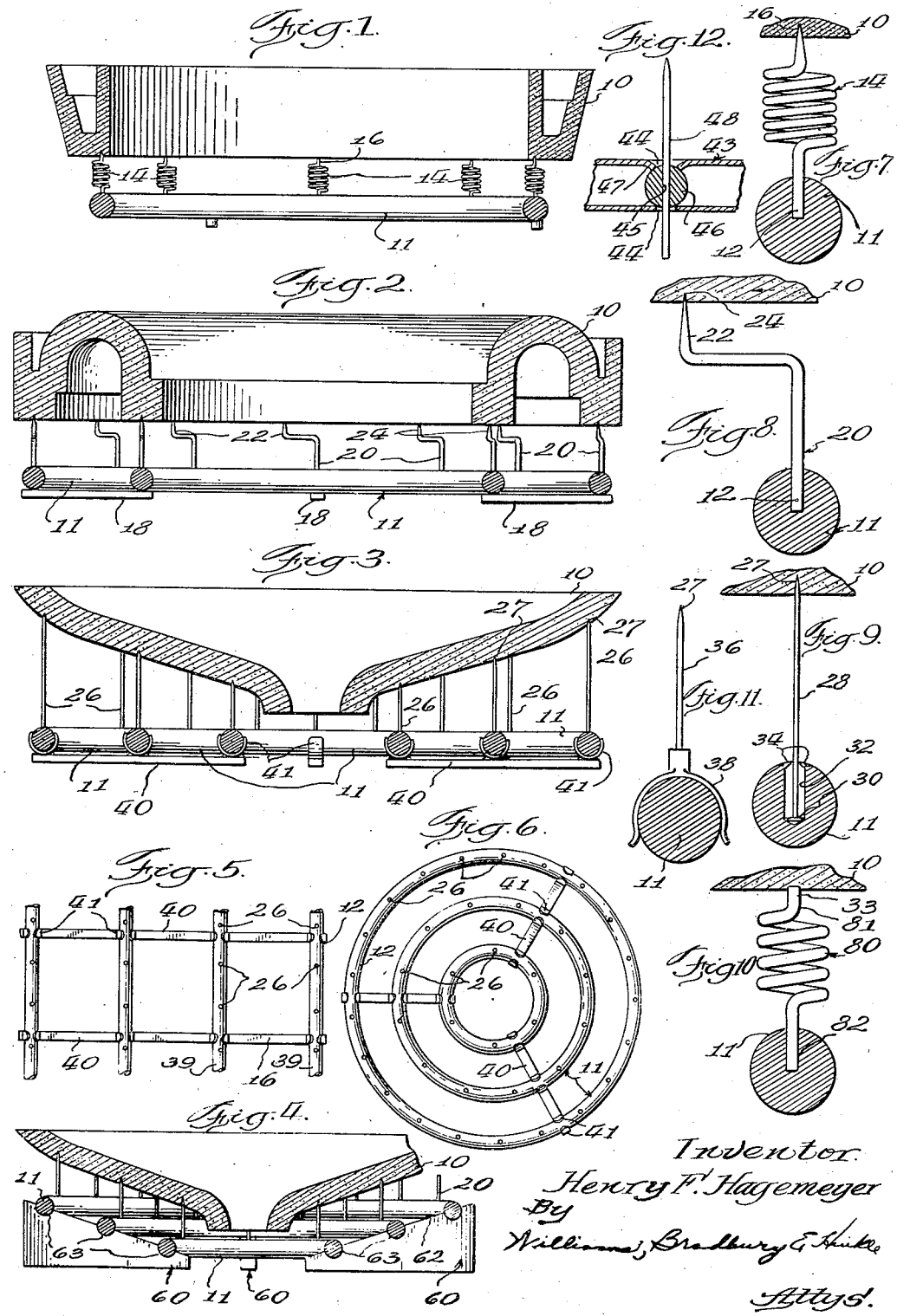

2,311,942

UNITED STATES PATENT OFFICE 2,311,942

MEANS FOR SUPPORTING PLASTIC ARTICLES

Henry F. Hagemeyer, Chicago, Ill., assignor to Castings Patent Corporation, Chicago, Ill., a corporation of Illinois Application February 7, 1941, Serial No. 377,859

9 Claims. (Cl. 25—153)

My invention relates to the art of casting generally and, more specifically, to a supporting means for use in drying or otherwise curing articles of plastic material, which shrink or expand during the curing process, for example, molds or mold parts of gypsum base material.

In the preparation of molds, cores or other mold parts of plastic material, such as gypsum base material which includes gypsum, water and a binding agent, it has been found that considerable shrinkage takes place during the drying or curing process.

Due to the amount of shrinkage which takes place, any substantial resistance to this natural shrinkage causes an impairment of the mold, such as warping and cracking, and at times the mold may have a piece torn therefrom by the support. This difficulty has increased the cost of castings made from molds of certain compositions, due to the large number of molds it has been found necessary to reject.

The drying apparatus disclosed and claimed in my prior Patent No. 2,201,038, issued May 14, 1940, which relates to a drying well for drying molds of plastic material has been found to be very successful in overcoming the aforementioned difficulties so long as the molds to be dried are rectangular or cylindrical in shape, or are otherwise provided with at least one flat side of considerable area. However, it has not been found entirely successful when used for drying molds or mold parts of an irregular shape.

To overcome all of the aforementioned difficulties, I have provided a mold supporting means or member which may be used to dry molds or parts of molds of any shape or contour, and which offers a minimum of resistance to the natural shrinkage of the mold or mold parts.

The principal object of the present invention is to provide a novel support which permits shrinkage of a supported plastic article without subjecting the supported article to distorting stresses.

Another object of the present invention is to provide a mold supporting means which offers the minimum of resistance to the shrinkage of a mold and which includes a plurality of intermediate supporting members adapted to move in the direction of such shrinkage.

Another object of the present invention is to provide a mold drying support which permits the drying of molds having very thin shells without danger of the shells becoming cracked or distorted.

Still another object of the present invention is to provide a novel support for a mold part or the like, which evenly supports such objects even though the surface of the object placed against the support is uneven.

A further object of the present invention is to provide a supporting means which will insure uniform dimensional values throughout the cured mold.

A further object of the present invention is to provide a supporting means for molds which will permit exposing the entire mold area to air circulation during the drying or curing process.

A further object of the present invention is to provide a supporting means for molds which is simple and economical to manufacture and which will materially reduce the ultimate cost of the finished casting.

A further object of the present invention is to provide a mold supporting means which is adapted to be adjusted to support a mold of any shape or contour.

Other objects and advantages will become more apparent from the following description, reference being had to the accompanying drawing in which similar characters of reference refer to similar parts throughout the several views.

Figure 1 is a cross-sectional view, showing one form of my improved mold supporting means, with a mold section positioned thereon;

Figure 2 is a cross-sectional view, showing a modified form of the supporting means shown in Figure 1, with a mold section positioned thereon;

Figure 3 is a cross-sectional view of a modified form of the supporting means shown in Figures 1 and 2, with a mold section positioned thereon;

Figure 4 is a cross-sectional view, showing means for arranging the supporting means to accommodate a mold having a rounded bottom portion;

Figure 5 is a plan view, with a portion of my improved mold supporting means cut away to show an example of one form a remaining portion of the supporting means of my invention may take;

Figure 6 is a plan view similar to Figure 5, showing another form a portion of the supporting means of my invention may take;

Figures 7 to 12 inclusive, are enlarged views, partly in cross-section, showing various forms which an intermediate supporting means of my invention may take, and the manner in which the intermediate supporting means is secured to the main supporting member.

Referring now to the drawing, and more particularly to Figures 1 to 3 inclusive, 10 indicates a mold or mold part to be dried or cured. Before curing the mold part is saturated with water, which must be at least partially eliminated before the part is ready to be assembled with its companion part, preparatory to pouring the metal into the mold cavities.

In the preparation of a complete mold of the gypsum base type or certain other types, the highest degree of care must be taken to insure accuracy of the mold sections so that the several sections will fit one upon or within the other, with the corresponding impressions in each section meeting in exact alignment. Any cracking, warping or other distortion causes either the loss of the complete mold or some portion of it. The mold supporting means of my invention, to be described hereinafter, insures such accuracy with the minimum amount of expense and equipment, and is characterized by the use of a main supporting means which, in general, serves as a base and a plurality of intermediate supporting members which are attached to the main supporting means and carry the mold or mold part.

In Figure 1 I have shown a mold part 10 of annular shape. The lower surface of this mold part forms a comparatively narrow ring of comparatively large diameter. In order to support a mold part or other plastic article of such a shape, I prefer to provide a supporting means 11 shaped as a ring and formed of some comparatively rigid material, such as the steel bar shown. This supporting means is shaped so that it generally conforms to the surface to be supported. That is, in the present instance, the ring 11 is approximately the same diameter as the annular mold part 10 to be supported. This bar 11 is provided with a plurality of holes extending vertically thereinto which receive the lower ends 12 of comparatively light coil springs 14. These springs are therefore anchored to the supporting means 11 and extend upwardly therefrom a distance sufficient to permit the free circulation of air around the part to be cured. The upper ends of these springs are bent so they extend vertically and, in the embodiment shown, are sharpened to points 16 and are of such a height that their upper ends generally conform to the contour of the surface to be supported. Since the part shown in Fig. 1 is annular and the lower surface is a plane, all of the points 16 are approximately at the same level.

In the use of this device, the mold part to be cured is lowered gently upon the points 16. These points penetrate the mold material a short distance and prevent the mold part from sliding off its support. It will be appreciated that since the springs are comparatively light, any irregularity in the lower surface of the part to be supported or any irregularity in the heights of the several springs will do no substantial damage. That is, if one of the points 16 should be higher than the others, the mold part when lowered will touch this point first and compress the spring attached to the point until the mold part is settled evenly on all of the other points. Although the part when thus suspended will be subjected to slightly greater penetration by the spring which was most compressed, this slight irregularity in the spring pressures, if kept within reasonable limits, is of no consequence.

As the part shrinks or expands during the curing process, it will be appreciated that the springs will tilt either inwardly or outwardly, as the case may be. Since the springs offer very little resistance to such tilting, the mold part will be subjected to only slight force tending to resist this shrinkage or expansion. After the part has cured, it is lifted from the points 16 and the springs automatically return these points to their initial positions in preparation for a curing operation to be conducted upon a successive similar part.

In Fig. 2, I have shown an annular mold part with a reentrant annular face therein. Thus, the surface from which this part is to be supported comprises two annular rings. I therefore provide a supporting means 11 comprised of two annular rings. A plurality of small rods 18 are welded between the two rings at intervals to maintain them in proper relative relationship. The two rings are of such diameters that they come beneath the surfaces to be supported. The intermediate supports 20 secured to the rings 11 and which support the mold part 10 are shown in Fig. 2 as constructed in an alternative manner. As shown in greater detail in Fig. 8, these intermediate supporting members consist of upstanding pins anchored at their lower ends in the bars 11. The upper portions of these pins are offset in a direction generally at right angles to the direction of mold shrinkage and at the ends of the offset portions are provided with upstanding portions 22 sharpened to points 24 which, as in the prior embodiment, are intended to penetrate into the mold surface.

Since the points 24 are offset away from the anchored ends of the pins, it will be appreciated that the pins can flex somewhat to insure an even support for the mold part 10, in spite of slight irregularities in the surface of the mold part or in spite of irregularities in the heights of the several pins 20. Likewise, contraction of the mold part will cause the pins to twist, and since the pins are of comparatively light gauge wire, this twisting of the pins will offer very little resistance to contraction of the mold.

In Figs. 3 and 4, I have shown a bowl-shaped mold part and two arrangements for supporting such a part. In Fig. 3, a set of three concentric supporting rings 11 are arranged beneath the bowl and are secured together by metal strips or bars 18. Each of these rings is provided with upstanding straight pins 26 of such lengths that their upper ends will impinge against the lower surface of the bowl at approximately the same moment when the bowl is lowered upon the pin points 21. Since the lower surface of the bowl is not a plain surface, the pins farther from the center thereof will be somewhat longer than those nearest to the center. In this embodiment the straight pins 26 are anchored to the rings and bend inwardly as the mold part contracts.

Since the outer row of pins are farther from the center of the mold part than the inner row, it will be appreciated that the contraction of the mold will be greater at the point where it is supported by this outer row of pins and that therefore, the upper ends of the outer row of pins will be required to move inwardly a greater distance than the pins in the inner row. This is automatically compensated for by the fact that the pins in the outer row are longer and, therefore, more flexible than those in the inner row. In this embodiment of the invention, the upper ends of the individual pins are not movable in a vertical direction to adjust for irregularities in the surface of the mold part for irregularities in the heights of the pins. However, since the upper ends of these pins are provided with sharp points, this adjustment for irregularities is accomplished by some of the pins penetrating into the mold a greater distance than others.

In Fig. 9, I have shown an alternative arrangement for securing pins of the type shown to the supporting members 11. The pin 28 here shown is of the ordinary dressmaker type and is provided with a head 30 at one end. To mount pins of this type in the bars 11, I drill holes 32, of somewhat greater diameter than the pin heads, into the bars. The heads of the pins are then inserted into these holes and the upper ends of the holes peened over at 34 sufficiently to prevent the pins from falling out.

In Fig. 11, still another alternative arrangement is shown. This arrangement consists of a pin 36, which may be either a straight pin or a bent pin, as shown in Fig. 8, or a coil spring of the type shown in Fig. 7. This pin is secured to a spring clip 38 of proper size to be snapped over the supports 11. By the use of this arrangement, a quantity of these pins secured to clips can be kept on hand and these pins can be quickly attached wherever desired to frames constructed for drying some particular mold part. By the use of this arrangement, it is not necessary to store curing racks with the pins attached thereto. As shown in Figs. 5 and 6, it is also possible to have a quantity of rings, straight frame members and other comparatively standardized members, which can be assembled and secured by clips or other securing means to rods in order to provide frames to which the pins can be attached by the clips 38.

More specifically, the frame members 11 and 39 of Figs. 5 and 6 are removably secured in proper relationship one to the other by means of rods 40, which are provided with spring clips 41. In accordance with this arrangement, it is possible to keep in stock a number of prefabricated members 11 and 39 of various sizes, so as to be in a position to meet the requirements of any particular mold or mold part to be cured. If the mold part requires three rings 11, as shown in Fig. 3, the attendant may quickly assemble a supporting means to meet that requirement. The pins or part engaging means 36 may then be mounted on the rings 11 by snapping the clips 38 onto the rings in the manner heretofore described. It will also be obvious that the entire supporting means can be disassembled with the minimum amount of effort, or reduced or enlarged to accommodate different sized molds or mold parts.

In Fig. 12, still another alternative arrangement for securing the pins 48 to the supporting member is shown. In accordance with this arrangement, the pins 48 are adapted to move at an angle with respect to the supporting member, and, in addition, it is possible to raise and lower the pins 48 to alter their height without removing the pins from the supporting member. The particular arrangement last mentioned comprises a hollow tube 43, provided with a plurality of holes 44 extending vertically therethrough, which form circular openings adapted to embrace balls 46. These balls are held within the tube 43 by peening the edges 47. The peening of the edges 47, in such a fashion as to engage the ball 46, permits the ball 46 to rotate but not roll freely within the tube. The pin 48 is then mounted in the hole 45 of the ball 46, in such a fashion that the pin may be raised and lowered with respect to the tube 43, by merely tapping the ends of the pins 48.

In Fig. 4, there is shown another arrangement for assembling the main supporting means, so as to support a bowl-shaped member, which eliminates the necessity of providing pins 26 of varying height, as heretofore explained with reference to Fig. 3. In accordance with this arrangement, a rack 60 is provided, having an inclined side portion 62 on the side facing the mold part to be cured. Along the inclined edge of the rack 60, and spaced a predetermined distance apart, is a series of notches 63, adapted to receive and hold securely the members 11 or 39. In this arrangement the pins 26 are all the same length, however the pins on the outer member 11 may be made of lighter gauge wire than the pins 26 on the adjacent ring, and the pins on the inner ring may be made of a heavier gauge wire than the pins on the adjoining rim. The pins 26, when thus arranged, will react in the same manner as the pins in Fig. 3.

In Fig. 10, a still further alternative arrangement of the article engaging means, and the manner in which the said means is secured to the supporting member, is shown. In accordance with this arrangement, the comparatively light compression spring 80 has one end mounted in a vertically extending aperture 82 in ring 11. The opposite end 33, or the mold engaging portion of the spring 80, is shown as flat rather than pointed. This arrangement has been found to be successful, particularly when the mold or mold part is slightly curved, due to the fact that the spring 80 will contract sufficiently when a mold or mold part is brought to rest on the ends 33 to automatically compensate for variations in weight in the mold or mold part and, at the same time, automatically adjust itself to the contour of the mold or mold part to be cured.

In all of the embodiments of my invention, it should be noted that the mold or mold part is so supported that the entire area of the mold or mold part is exposed to circulation of air during the drying or curing process.

It will thus be seen that I have provided a new and improved supporting means for supporting articles of plastic material, which permits movement of the article engaging means at an angle to the main supporting member and the resistance of such article supporting means to the natural shrinkage of the article is well within the resistance strength of the material of the article to deformation.

Having thus described my invention, what I claim as new and desire to secure by Letters Patent of the United States is:

1. A device for supporting articles subject to shrinkage or expansion comprising a supporting means, article engaging means supported by said supporting means and having at least a portion thereof adapted to move resiliently with respect to said supporting means under the influence of forces brought to bear upon said engaging means by the engaged article, and a portion of said engaging means being offset at an angle to the direction of shrinkage or expansion of said article.

2. A device for supporting articles subject to shrinkage or expansion comprising a supporting means, article engaging means supported by said supporting means and adapted to support an article on their upper ends, and the upper ends of said article engaging means adapted to have relative movement to each other and to said supporting means, and means for altering the shape of said supporting means and the plane of the upper ends of said article engaging means.

3. A device for supporting articles subject to dimensional change, comprising a supporting means, a plurality of article engaging pins adapted to bear with their points against the article to be supported and universally resilient means securing said pins to said supporting means so as to permit resilient movement of said pin points in all directions relative to each other and relative to the supporting means, whereby supported articles of uneven contour will depress some of said pins more than others of said pins, and whereby dimensional change in said supported article will move some of said pins relative to others of said pins without shifting said pin points relative to their points of engagement with the supported article.

4. A device for supporting articles having a generally convex lower surface subject to dimensional change, comprising a supporting means, a plurality of article engaging pins adapted to engage the article to be supported with their pin points, said pins being attached to said supporting means at their lower ends, said pins being inherently flexible throughout the major portion of their length so that their upper ends are adapted to be resiliently movable relative to the supporting means because of the inherent flexibility of said pins, and said pins being of different lengths and so arranged that the longer pins are spaced farther from the center of the article to be supported than the shorter pins, whereby the upper ends of said pins generally conform to the lower surface of the article and whereby pins arranged farther from the center of the article to be supported are inherently more flexible than the pins adjacent the center of the article to be supported.

5. A device for supporting relatively easily penetrated articles subject to dimensional change, comprising a supporting means, a plurality of article engaging pins adapted to penetrate into the article to be supported, so as to resist relative movement between the article to be supported and the pin points in a sidewise direction, said pins being inherently resilient so that dimensional change in the article to be supported will bend said pins rather than cause movement of said pin points relative to their points of engagement with the article to be supported, and said pin points being thin and sharp and adapted to penetrate the article to be supported with ease, so that slight irregularity between the surface of the article to be supported and the upper ends of said pins will automatically be compensated for by certain of said pins penetrating said article to a greater distance than others of said pins.

6. A device for supporting easily penetrated articles subject to shrinkage or expansion while supported, comprising a supporting means, article engaging means supported by said supporting means, said article engaging means comprising pins secured at one end to the supporting means and having points at their opposite ends adapted to penetrate the article to be supported, said pins being long, slender and flexible so that dimensional change of the article between any two of said points will cause movement of said points mutually toward or away from each other, without causing movement of said points relative to the article supported at the points of engagement.

7. A device for supporting articles subject to shrinkage or expansion, comprising a supporting means, a plurality of article engaging elements, resilient means connecting said engaging elements to said supporting means so that said engaging elements are resiliently movable relative to said supporting means, whereby dimensional change in the supported article will cause movement of said engaging elements relative to each other and to the supporting means because of the resilient connection between said engaging elements and the supporting means.

8. A device for supporting articles subject to dimensional change while supported, comprising a supporting means, a plurality of members adjustably secured to said supporting means, said members having generally upwardly extending resilient portions and article engaging means located at the tops of said resilient portions.

9. A device for supporting articles subject to shrinkage or expansion, comprising a supporting means, a plurality of article engaging pins, and universally movable means securing said engaging pins to said supporting means, so that the upper ends of said pins which are engaged by said article can move universally relative to each other and to the support under the influence of shrinkage or expansion in said article.

HENRY F. HAGEMEYER.